United States Patent
Liu

(10) Patent No.: US 8,879,705 B2
(45) Date of Patent: Nov. 4, 2014

(54) METHOD, DEVICE, AND TERMINAL FOR IMPLEMENTING INCOMING CALL PROTECTION

(75) Inventor: Weijie Liu, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 299 days.

(21) Appl. No.: 13/410,533

(22) Filed: Mar. 2, 2012

(65) Prior Publication Data

US 2012/0163575 A1    Jun. 28, 2012

Related U.S. Application Data

(63) Continuation of application No. PCT/CN2010/076302, filed on Aug. 24, 2010.

(30) Foreign Application Priority Data

Sep. 2, 2009 (CN) .......................... 2009 1 0167278

(51) Int. Cl.
*H04M 3/42* (2006.01)
*H04M 1/663* (2006.01)

(52) U.S. Cl.
CPC .......... *H04M 1/663* (2013.01); *H04M 2250/60* (2013.01)
USPC .................................... 379/207.04; 379/201.1

(58) Field of Classification Search
USPC ......................................... 379/207.04–207.1
See application file for complete search history.

(56) References Cited

U.S. PATENT DOCUMENTS

| | | | | |
|---|---|---|---|---|
| 6,307,930 | B1* | 10/2001 | Mayer ...................... | 379/215.01 |
| 7,206,500 | B1* | 4/2007 | Novak et al. .................. | 386/248 |
| 7,639,791 | B2* | 12/2009 | Hodge ...................... | 379/207.01 |
| 8,326,271 | B2* | 12/2012 | Satake et al. ............... | 455/412.2 |
| 2005/0002497 | A1 | 1/2005 | Brown et al. | |

FOREIGN PATENT DOCUMENTS

| CN | 1913714 A | 2/2007 |
|---|---|---|
| CN | 19113714 A | 2/2007 |

(Continued)

OTHER PUBLICATIONS

International Search Report and Written Opinion of the International Searching Authority issued in corresponding PCT Patent Application No. PCT/CN2010/076302, mailed Dec. 2, 2010.

(Continued)

*Primary Examiner* — Joseph T Phan
(74) *Attorney, Agent, or Firm* — Brinks Gilson & Lione

(57) ABSTRACT

The present invention discloses a method, a device, and a terminal for implementing incoming call protection. The method includes: determining, according to a frequency for operating a terminal by a user, whether a status of an incoming call protection mode is on or off; if the incoming call protection mode is on, when an incoming call signal arrives, delaying the incoming call signal; and if the incoming call protection mode is off, when an incoming call signal has been delayed and the incoming call signal still continues, releasing the incoming call signal, and when an incoming call signal has been delayed, but the incoming call signal becomes weak or has disappeared, prompting the user that there is a missed call. According to the present invention, a problem of unwittingly connecting or hanging up an incoming call by a user is effectively solved.

12 Claims, 4 Drawing Sheets

(56) References Cited

FOREIGN PATENT DOCUMENTS

| | | | |
|---|---|---|---|
| CN | 101198114 A | | 6/2008 |
| CN | 101316425 A | | 12/2008 |
| CN | 101472009 A | * | 7/2009 |
| CN | 101651748 A | | 2/2010 |
| CN | 101651748 B | | 11/2011 |
| WO | WO 2011026400 A1 | | 3/2011 |

OTHER PUBLICATIONS

First Office Action issued in corresponding Chinese Patent Application No. 200910167278.7 (including English Translation and Verification of Translation); mailed Apr. 25, 2011.

Notification of Grant the Invention Patent Right (including English Translation and Verification of Translation); mailed Aug. 30, 2011.

* cited by examiner

METHOD, DEVICE, AND TERMINAL FOR IMPLEMENTING INCOMING CALL PROTECTION

CROSS-REFERENCE TO RELATED APPLICATIONS

This application is a continuation of International Application No. PCT/CN2010/076302, filed on Aug. 24, 2010, which claims priority to Chinese Patent Application No. 200910167278.7, filed on Sep. 2, 2009, both of which are hereby incorporated by reference in their entireties.

FIELD OF THE INVENTION

The present invention relates to the field of communications technologies, and in particular, to a method, a device, and a terminal for implementing incoming call protection.

BACKGROUND OF THE INVENTION

As the society develops, the use of hand-held mobile terminals becomes more and more frequent. However, during the process of use, incorrect operations of a mobile phone usually occur due to an unexpected conflict. For example, when an incoming call arrives while a user is frequently operating a mobile phone, such as, sending a short message and playing games, a situation that the incoming call is hung up or connected because a phone ringtone is not heard or even the incoming call is not known may be caused. This situation brings a sensation to the user that the mobile phone is uncontrollable, user experience is poor, and meanwhile, a series of unnecessary troubles or misunderstandings may also be incurred.

In the process of implementing the present invention, the inventor finds through researches that, there is still no prior art for solving the foregoing problems currently.

SUMMARY OF THE INVENTION

Embodiments of the present invention provide a method, a device, and a terminal for implementing incoming call protection, so as to effectively solve a problem of unwittingly connecting or hanging up an incoming call.

The embodiments of the present invention provide the following technical solutions.

An embodiment of the present invention provides a method for implementing incoming call protection, where the method includes:

determining, according to a frequency for operating a terminal by a user, whether a status of an incoming call protection mode is on or off;

if the incoming call protection mode is on, when an incoming call signal arrives, delaying the incoming call signal; and if the incoming call protection mode is off, when an incoming call signal has been delayed and the incoming call signal still continues, releasing the incoming call signal, and when an incoming call signal has been delayed, but the incoming call signal becomes weak or has disappeared, prompting the user that there is a missed call.

An embodiment of the present invention further provides a device for implementing incoming call protection, where the device includes:

a judging unit, configured to judge, according to a frequency for operating a terminal by a user, whether a status of an incoming call protection mode is on or off;

a switch unit, configured to turn on or turn off the incoming call protection mode according to the judgment of the judging unit;

a processing unit, configured to, if the status of the incoming call protection mode is on, when an incoming call signal arrives, delay the incoming call signal, if the status of the incoming call protection mode is off, when an incoming call signal has been delayed and the incoming call signal still continues, release the incoming call signal, and when an incoming call signal has been delayed, but the incoming call signal becomes weak or has disappeared, prompt the user that there is a missed call.

An embodiment of the present invention further provides a terminal, where the terminal includes the foregoing device for implementing the incoming call protection.

In the method, the device, and the terminal for implementing incoming call protection according to the embodiments of the present invention, an incoming call protection function is added, so that the problem of unwittingly connecting or hanging up an incoming call by a user is effectively solved. Meanwhile, the terminal is more intelligent and user-friendly, and user experience is also effectively improved.

BRIEF DESCRIPTION OF THE DRAWINGS

To illustrate the technical solutions according to the embodiments of the present invention or in the prior art more clearly, accompanying drawings required for describing the embodiments or the prior art are introduced below briefly. Apparently, the accompanying drawings in the following descriptions are merely some embodiments of the present invention, and persons of ordinary skill in the art may further obtain other drawings according to these accompanying drawings without creative efforts.

DETAILED DESCRIPTION OF THE EMBODIMENTS

Embodiments of the present invention provide a method, a device, and a terminal for implementing incoming call protection, so as to effectively solve a problem of unwittingly connecting or hanging up an incoming call by a user. In order to make the objectives, technical solutions, and advantages of the present invention more clearly, the present invention is further described in detail with reference to the accompanying drawings and embodiments below.

Figure 1:
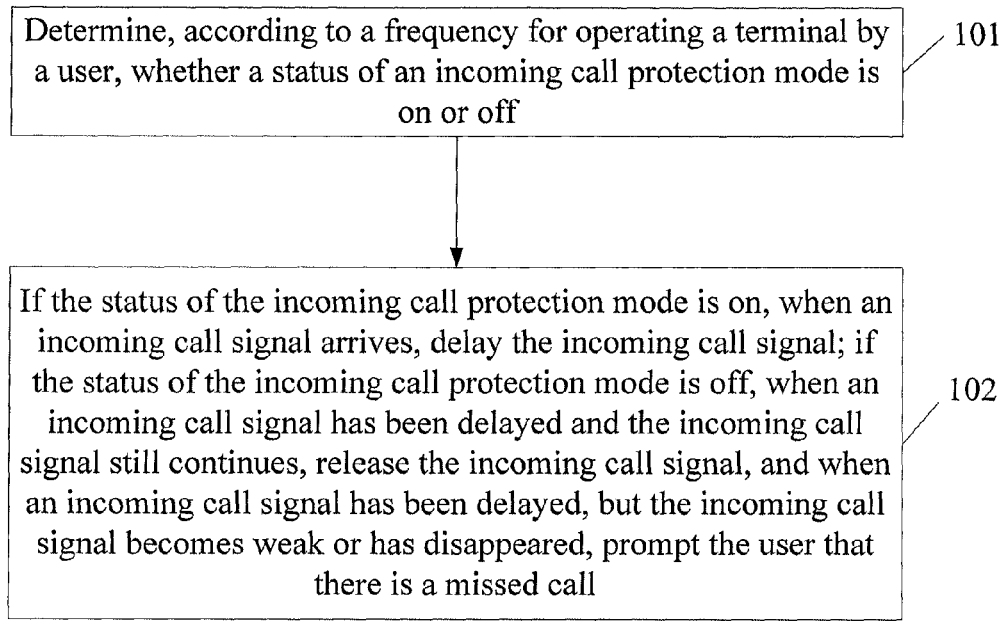
FIG. 1 is a general flow chart of a method for implementing incoming call protection according to a first embodiment of the present invention.

FIG. 1 is a general flow chart of a method for implementing incoming call protection according to a first embodiment of the present invention. The method includes the following processes.

Step 101: Determine, according to a frequency for operating a terminal by a user, whether a status of an incoming call protection mode is on or off.

Step 102: If the status of the incoming call protection mode is on, when an incoming call signal arrives, delay the incoming call signal; if the status of the incoming call protection mode is off, when an incoming call signal has been delayed and the incoming call signal still continues, release the incoming call signal, and when an incoming call signal has been delayed, but the incoming call signal becomes weak or has disappeared, prompt the user that there is a missed call.

Specifically, the determining the status of the incoming call protection mode according to the frequency for operating the terminal by the user in step 101 includes: turning on the incoming call protection mode if the frequency for operating the terminal by the user is greater than or equal to a preset frequency; and turning off the incoming call protection mode if the frequency for operating the terminal by the user is less than the preset frequency. It should be noted that, the frequency may be set according to an actual situation, and is not limited in the embodiment of the present invention. In addition, besides the determining the status of the incoming call protection mode according to the frequency for operating the terminal by the user in the embodiment of the present invention, other specific judging criteria may also be used as long as the frequency for operating the terminal by the user can be embodied, and which is not limited in the embodiment of the present invention.

In a specific embodiment, a user interface of a terminal, for example, a keyboard or a touch device, receives an operation on the terminal by a user, and transmits related operation information to a processor of the terminal, for example, a CPU, and the related operation information is processed by the CPU of the terminal to obtain a frequency for operating the terminal by the user. The CPU compares the frequency for operating the terminal by the user with a preset frequency, and decides, according to a comparison result, whether to turn on or turn off the incoming call protection mode, where the incoming call signal may be a common voice call, or an audio/video incoming call signal of a video phone.

In addition, step 101 further includes: determining, according to a preset of the user, whether the incoming call protection mode is enabled or disabled. That is to say, the user pre-sets whether to enable the incoming call protection mode, and if the incoming call protection mode is enabled, when the user operates the terminal, the system needs to judge the frequency for operating the terminal by the user in real-time, and further performs corresponding processing; if the incoming call protection mode is disabled, the system still performs processing in a general processing manner at this time. It should be noted here that, the incoming call protection mode in the present invention is provided to solve the foregoing problem of unwittingly connecting or hanging up an incoming call by a user in the prior art, and a specific processing process in the status that the incoming call protection mode is turned on or turned off is described as follows.

In step 102, if the incoming call protection mode is turned on, when an incoming call signal arrives, the incoming call signal is delayed, and meanwhile, processing may be further performed according to a prompt manner preset by the user. The prompt manner preset by the user includes, but is not limited to, ringing, or vibration, or pop-up box, or no prompt. It should be noted that, the prompt manner preset by the user may be stored in actual application.

In step 102, if the incoming call protection mode is turned off, when an incoming call signal has been delayed, but the incoming call signal becomes weak or has disappeared, prompting the user that there is a missed call, and processing may be further performed according to a reply manner and content that are preset by the user. The reply manner preset by the user includes, but is not limited to, short message reply or no reply. It should be noted that, the reply manner and content that are preset by the user may be stored in actual application.

In order to make the technical solution of the foregoing embodiment of the present invention more comprehensible, processes for implementing the two situations that a user operates a terminal and an incoming call signal arrives are specifically described through two specific embodiments below respectively.

Figure 2:
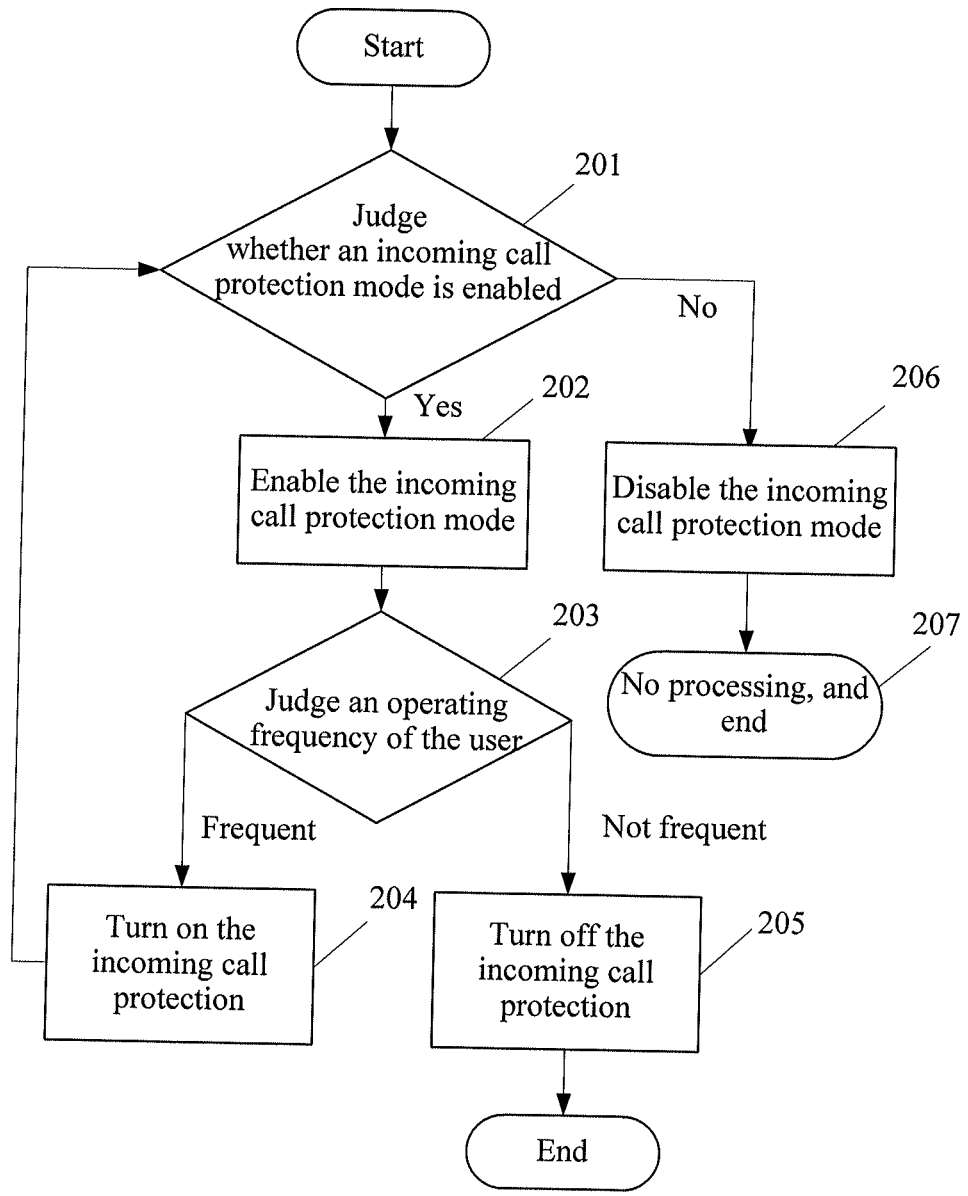
FIG. 2 is a specific flow chart of a method for implementing incoming call protection according to a second embodiment of the present invention.

FIG. 2 is a specific flow chart of a method for implementing incoming call protection according to a second embodiment of the present invention. As shown in FIG. 2, the method includes:

Step 201: When a user begins to operate a terminal, a system first judges whether an incoming call protection mode is enabled, if the incoming call protection mode is enabled, the process proceeds to step 202, and if the incoming call protection mode is disabled, the process proceeds to step 206.

Step 202: Enable the incoming call protection mode.

Step 203: The system judges a frequency for operating the terminal by the user, the process proceeds to step 204 if the operating frequency is high, and the process proceeds to step 205 if the operating frequency is not high.

Step 204: Turn on the incoming call protection mode.

Step 205: Turn off the incoming call protection mode.

Step 206: Disable the incoming call protection mode.

Step 207: Process according to a processing manner of a common terminal.

Figure 3:
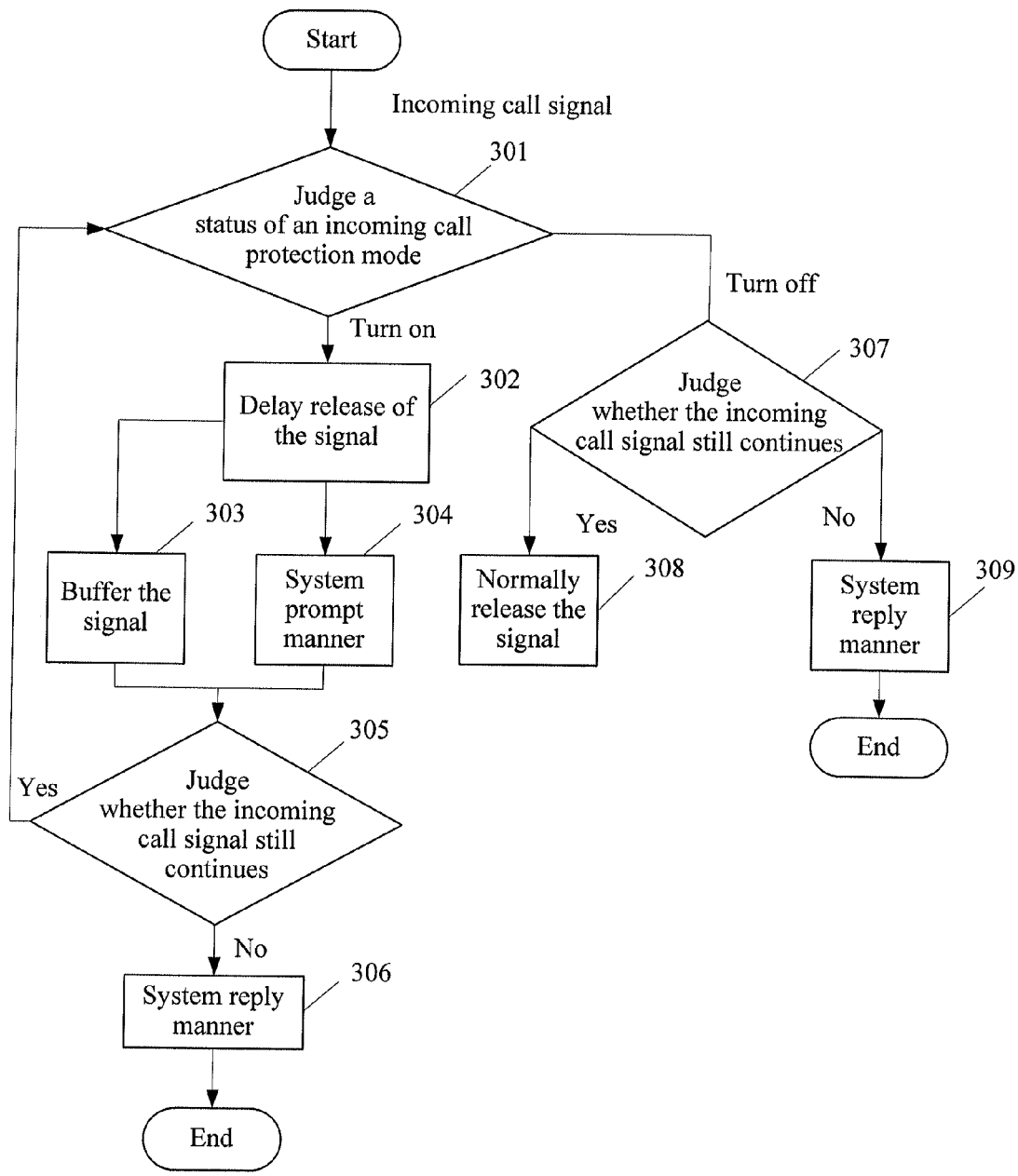
FIG. 3 is a specific flow chart of a method for implementing incoming call protection according to a third embodiment of the present invention.

FIG. 3 is a specific flow chart of a method for implementing incoming call protection according to a third embodiment of the present invention. The method includes:

Step 301: When an incoming call signal arrives, a system judges a status of an incoming call protection mode, the process proceeds to step 302 if the status of the incoming call protection mode is on, and the process proceeds to step 307 if the status of the incoming call protection mode is off.

Step 302: The system delays release of the incoming call signal.

Step 303: Buffer the incoming call signal.

Step 304: The system invokes a prompt manner, and prompts according to the prompt manner.

Step 305: The system judges whether the incoming call signal still continues in real-time, the process proceeds to step 301 if the incoming call signal still continues, and the process proceeds to step 306 if the incoming call signal becomes weak or has disappeared.

Step 306: The system reads a reply manner set by the user and performs processing.

Step 307: The system judges whether the incoming call signal still continues, the process proceeds to step 308 if the incoming call signal still continues, and the process proceeds to step 309 if the incoming call signal becomes weak or has disappeared.

Step 308: The system normally releases the incoming call signal.

Step 309: The system reads the reply manner set by the user and performs processing.

In a specific embodiment, the foregoing system mainly refers to an operating system of the terminal, and performs processing by controlling a CPU of the terminal.

In the method for implementing incoming call protection according to the embodiment of the present invention, an incoming call protection function is added, so that the problem of unwittingly connecting or hanging up an incoming call by a user is effectively solved. Meanwhile, the terminal is more intelligent and user-friendly, and user experience is also effectively improved.

Figure 4:
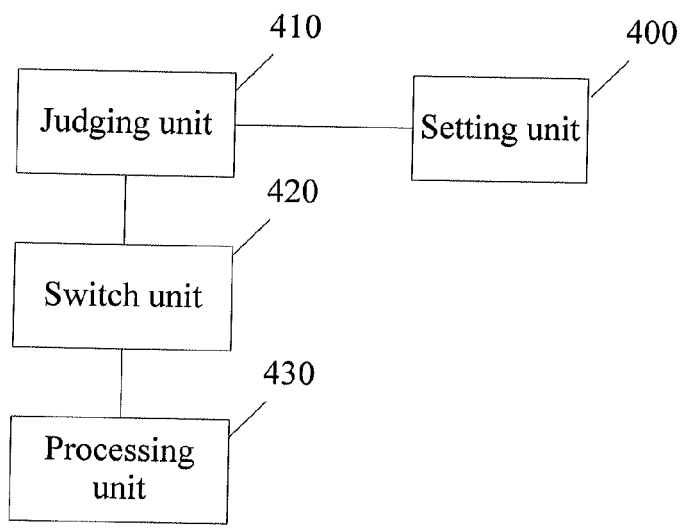
FIG. 4 is a general schematic structural diagram of a device for implementing incoming call protection according to a fourth embodiment of the present invention.

FIG. 4 is a general schematic structural diagram of a device for implementing incoming call protection according to a fourth embodiment of the present invention. The device includes a judging unit 410, a switch unit 420, and a processing unit 430.

The judging unit 410 is configured to judge, according to a frequency for operating a terminal by a user, whether a status of an incoming call protection mode is on or off.

The switch unit 420 is configured to turn on or turn off the incoming call protection mode according to the judgment of the judging unit 410.

The processing unit 430 is configured to, if the status of the incoming call protection mode is on, when an incoming call signal arrives, delay the incoming call signal; if the status of the incoming call protection mode is off, when an incoming call signal has been delayed and the incoming call signal still continues, release the incoming call signal, and when an incoming call signal has been delayed, but the incoming call signal becomes weak or has disappeared, prompt the user that there is a missed call.

Specifically, the judging unit 410 specifically judges, according to the frequency for operating the terminal by the user, whether the status of the incoming call protection mode is on or off in real time when it is determined, according to a preset of the user, that the incoming call protection mode is enabled. The judging unit 410 detects the frequency for operating the terminal by the user in real time, judges the status of the incoming call protection mode is on when the operating frequency is higher than or equal to a preset frequency, and judges the status of the incoming call protection mode is off when the operating frequency is less than the preset frequency.

The processing unit 430 is specifically configured to, if the status of the incoming call protection mode is on, when an incoming call signal arrives, delay the incoming call signal, and perform processing according to a prompt manner preset by the user; if the status of the incoming call protection mode is off, when an incoming call signal has been delayed and the incoming call signal still continues, release the incoming call signal, and when an incoming call signal has been delayed but the incoming call signal becomes weak or has disappeared, prompt the user that there is a missed call and perform processing according to a reply manner and content that are preset by the user.

In addition, the device may further include a setting unit 400, configured to set, according to a user's instruction, the enabling or disabling of the incoming call protection mode, the prompt manner when an incoming call signal is delayed, and the reply manner and content when an incoming call signal has been delayed but the incoming call signal becomes weak or has disappeared. The prompt manner preset by the user includes, but is not limited to, ringing, or vibration, or pop-up box, or no prompt. The reply manner preset by the user includes, but is not limited to, short message reply or no reply.

Correspondingly, the device may further include a storage unit, configured to store information preset by the user.

It should be noted that, the foregoing device may specifically be various terminals, such as a hand-held mobile terminal, which is not limited to the present invention.

Figure 5:
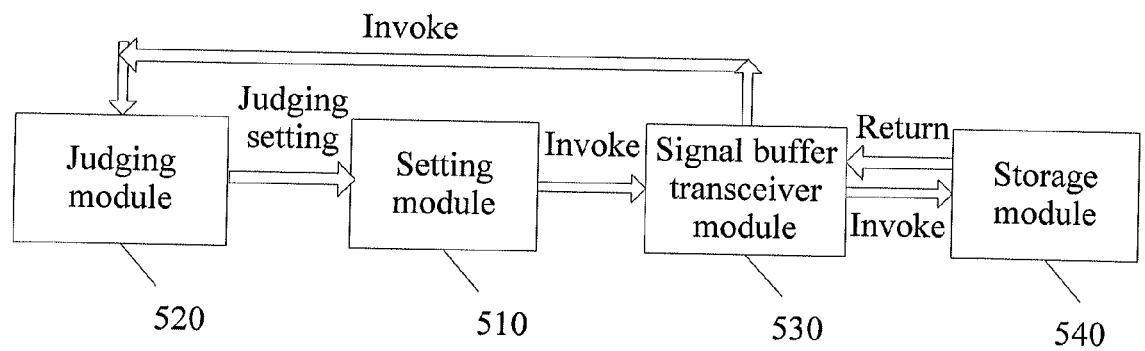
FIG. 5 is a schematic structural diagram of a system for implementing incoming call protection according to a fifth embodiment of the present invention.

FIG. 5 is a schematic structural diagram of a terminal for implementing incoming call protection according to a fifth embodiment of the present invention. The terminal includes a setting module 510, a judging module 520, a signal buffer transceiver module 530, and a storage module 540.

The setting module 510 is configured to set, according to a user's instruction, that an open status of an incoming call protection mode is enabled or disabled, set, according to the user's instruction, a prompt manner when an incoming call signal has been delayed in a status that the incoming call protection mode is enabled and turned on, where the prompt manner may specifically include, but is not limited to, ringing, or vibration, or pop-up box, or no prompt; and set, according to the user's instruction, a reply manner and content of the system after an signal has disappeared in a status that the incoming call protection mode is enabled and turned on, where the specific reply manner may include, but is not limited to short message reply or no reply; and the specific reply content may be set by the user according to personal preference.

In a specific embodiment, the setting module 510 may be a user interface of the terminal, for example, a menu operation interface of the terminal, an option of the enabled state and a specific option of the prompt manner in the enabled state may be provided on a specific menu operation interface.

The judging module 520 is configured to judge whether a status of the incoming call protection mode is enabled or disabled, when it is determined that the incoming call protection mode is enabled, judge, according to an operation situation on the terminal by the user, whether the status of the incoming call protection mode is on or off in real time, and invoke the signal buffer transceiver module 530 and the storage module 540 to perform corresponding processing when an incoming call signal arrives in the case that the status of the incoming call protection mode is on.

The signal buffer transceiver module 530 is configured to buffer an incoming call signal when the signal arrives if the incoming call protection mode is judged to be enabled and turned on after the system invokes the judging module 520 to perform the judgment, and release the signal if the signal still exists in the case that the incoming call protection mode is off.

The storage module 540 is configured to save the enabled or disabled status of the incoming call protection mode, the prompt manner when the incoming call signal is delayed, and the reply manner and content when the incoming call signal has been delayed but the incoming call signal becomes weak or has disappeared, which are set according to the user's instruction.

It should be noted that, the foregoing description of the method embodiments is also applicable to the device and terminal embodiments.

A specific application example is introduced below, for better understanding of the technical solutions in the foregoing embodiments of the present invention.

Assume that an incoming call protection mode is set to be disabled by a user. In this case, a processing manner of a system is the same as that of a common mobile phone, and is not further described here.

Assumed that the incoming call protection mode is set to be enabled, and a prompt manner when an incoming call signal is delayed is set to be vibration, and a reply manner when an incoming call signal has been delayed but the incoming call signal becomes weak or has disappeared is set to be short message reply by the user.

The user begins to edit a short message or play a game, that is, the user frequently operates the mobile phone at this time. At this time, an incoming call signal arrives, the system judges that the user is frequently operating the mobile phone, so the system delays the incoming call signal, and provides a vibration prompt. If the user feels the vibration, the users stops editing the short message or the game operation, the system judges that the user does not operate the mobile phone, and releases the incoming call signal, at this time, the user may choose to answer or hang up the call, if the user answer the call, the short message that is being edited by the user is automatically saved. If the user does not stop editing the short message or the game operation, the system judges that the user is still operating the mobile phone, and delays the incoming call signal, at the same time, the vibration continues till the incoming call signal disappears. After the incoming call signal has disappeared, if the user is still operating the mobile phone, the system returns a short message to a caller according to a short message setting preset by the user.

According to the device and the terminal for implementing incoming call protection according to the embodiments of the present invention, an incoming call protection function is added, so that a problem of unwittingly connecting or hanging up an incoming call by a user is effectively solved. Meanwhile, the terminal is more intelligent and user-friendly, and the experience is also effectively improved.

Persons of ordinary skill in the art should understand that all or part of the steps of the method according to the foregoing embodiments of the method may be implemented by a program instructing relevant hardware. The program may be stored in a computer readable storage medium. When the program is executed, one of or a combination of the steps according to the method embodiments is performed.

In addition, each functional unit according to each embodiment of the present invention may be integrated in one processing module, or each unit may also exist separately and physically, or two or more than two units are integrated in one module. The integrated module may be implemented through hardware, or may also be implemented through a software functional module. When the integrated module is implemented through the software functional module and sold or used as a separate product, the integrated module may be stored in a computer readable storage medium.

The storage medium mentioned above may be a read-only memory, a magnetic disk, or an optical disk.

To sum up, with the method, the device, and the terminal for implementing incoming call protection according to the embodiments of the present invention, the incoming call protection function is added, so that the problem of unwittingly connecting or hanging up an incoming call by a user is effectively solved. Meanwhile, the terminal is more intelligent and user-friendly, and the user experience is also effectively improved.

The method, the device, and the terminal for implementing incoming call protection according to the present invention are described in detail above. The principle and implementation of the present invention are described here through specific examples. The foregoing description about the embodiments is merely provided for ease of understanding of the technical solutions of the present invention. Persons of ordinary skill in the art can make variations and modifications to the present invention in terms of the specific implementations and application scopes according to the ideas of the present invention. Therefore, the specification shall not be construed as limitations to the present invention.

What is claimed is:

1. A method for implementing incoming call protection, comprising:
   determining, according to a frequency for operating a terminal by a user, whether a status of an incoming call protection mode is on or off, the determining, according to the frequency for operating the terminal by the user, the status of the incoming call protection mode comprises: turning on the incoming call protection mode if the frequency for operating the terminal by the user is greater than or equal to a preset frequency; and turning off the incoming call protection mode if the frequency for operating the terminal by the user is less than the preset frequency;
   if the status of the incoming call protection mode is on, when an incoming call signal arrives, delaying the incoming call signal; and
   if the status of the incoming call protection mode is off, when an incoming call signal has been delayed and the incoming call signal still continues, releasing the incoming call signal, and when an incoming call signal has been delayed, but the incoming call signal has disappeared, prompting the user that there is a missed call.

2. The method for implementing incoming call protection according to claim 1, wherein the delaying the incoming call signal when the incoming call signal arrives if the status of the incoming call protection mode is on further comprises:
   processing according to a prompt manner preset by the user.

3. The method for implementing incoming call protection according to claim 2, wherein the prompt manner preset by the user comprises ringing, or vibration, or pop-up box, or no prompt.

4. The method for implementing incoming call protection according to claim 1, wherein the prompting the user that there is the missed call when the incoming call signal has been delayed but the incoming call signal has disappeared if the status of the incoming call protection mode is off further comprises:
   processing according to a reply manner and content that are preset by the user.

5. The method for implementing incoming call protection according to claim 4, wherein the reply manner preset by the user includes short message reply or no reply.

6. The method for implementing incoming call protection according to claim 1, wherein before the determining, according to the frequency for operating the terminal by the user, whether the status of the incoming call protection mode is on or off, the method further comprises:
   enabling or disabling the incoming call protection mode according to a preset of the user, and when the incoming call protection mode is enabled, continuing subsequent steps.

7. A device for implementing incoming call protection, comprising:
   a judging unit, configured to judge, according to a frequency for operating a terminal by a user, whether a status of an incoming call protection mode is on or off, the judging unit is specifically configured to judge that the status of the incoming call protection mode is on when the operating frequency is higher than or equal to a preset frequency; and judge that the status of the incoming call protection mode is off when the operating frequency is less than the preset frequency;
   a switch unit, configured to turn on or turn off the incoming call protection mode according to the judgment of the judging unit; and
   a processing unit, configured to, if the status of the incoming call protection mode is on, when an incoming call signal arrives, delay the incoming call signal; if the status of the incoming call protection mode is off, when an incoming call signal has been delayed and the incoming call signal still continues, release an incoming call signal, and when an incoming call signal has been delayed, but the incoming call signal has disappeared, prompt the user that there is a missed call.

8. The device for implementing incoming call protection according to claim 7, wherein the processing unit is specifically configured to, if the status of the incoming call protection mode is on, when the incoming call signal arrives, delay the incoming call signal and process according to a prompt manner preset by the user; if the status of the incoming call protection mode is off, when the incoming call signal has been delayed and the incoming call signal still continues, release the incoming call signal, and when the incoming call signal has been delayed but the incoming call signal has disappeared, prompt the user that there is the missed call, and process according to a reply manner and content that are preset by the user.

9. The device for implementing incoming call protection according to claim 8, further comprising:
   a setting unit, configured to set, according to a user's instruction, the enabling and disabling of the incoming call protection mode, the prompt manner when the incoming call signal is delayed, and the reply manner and content when the incoming call signal has been delayed but the incoming call signal has disappeared.

10. A terminal, comprising the device for implementing incoming call protection according to claim 7.

11. A terminal, comprising the device for implementing incoming call protection according to claim 8.

12. A terminal, comprising the device for implementing incoming call protection according to claim 9.

* * * * *